United States Patent [19]

Heismann

[11] Patent Number: 5,388,394
[45] Date of Patent: Feb. 14, 1995

[54] LAWN MOWER GRASS COLLECTION INDICATOR

[75] Inventor: Richard A. Heismann, Jackson, Tenn.

[73] Assignee: Murray Outdoor Products, Inc., Jackson, Tenn.

[21] Appl. No.: 67,533

[22] Filed: May 25, 1993

[51] Int. Cl.$^6$ .............................................. A01D 34/12
[52] U.S. Cl. ...................................... 56/194; 56/203; 56/DIG. 8
[58] Field of Search ................... 56/194, 16.6, DIG. 8, 56/199, 200, 203, 202; 248/99

[56] References Cited

U.S. PATENT DOCUMENTS

| | | | |
|---|---|---|---|
| 654,372 | 7/1900 | West | 116/270 |
| 1,448,728 | 3/1923 | Clotworthy | 116/39 |
| 3,818,686 | 6/1974 | Haffner et al. | 56/11.1 |
| 3,863,428 | 2/1975 | Baxter | 56/10.2 |
| 3,971,198 | 7/1976 | Lane | 56/202 |
| 4,233,806 | 11/1980 | Richardson | 56/202 |
| 4,631,909 | 12/1986 | McLane | 56/202 |
| 4,635,047 | 1/1987 | Fox et al. | 340/684 |
| 4,791,779 | 12/1988 | Hoffman | 56/202 |
| 4,924,664 | 5/1990 | Hicks et al. | 56/202 |
| 4,964,266 | 10/1990 | Kolb | 56/202 |
| 4,969,320 | 11/1990 | Langford | 56/16.6 |
| 4,981,011 | 1/1991 | Olejak | 56/10.2 |
| 5,138,825 | 8/1992 | Trefz et al. | 56/11.1 |

FOREIGN PATENT DOCUMENTS 2101864 1/1983 United Kingdom .

Primary Examiner—Ramon S. Britts
Assistant Examiner—Pamela A. O'Connor
Attorney, Agent, or Firm—Heiskell, Donelson, Bearman, Adams, Williams & Caldwell

[57] ABSTRACT

An indicator mechanism for visually displaying the full condition of a lawn mower grass collection bag, specially adapted for use on a riding lawn mower having a rear mounted bag. The indicator mechanism comprises a housing mounted to the discharge chute leading from the mower cutting deck to the collection bag, in a position visible to the driver during normal cutting operation of the mower. The housing includes a compartment in communication with the interior of the discharge duct through a suitable opening. An indicating member is hingedly disposed within the housing and is movable between a lowered position and a raised position in response to pressure variations caused by changes in the air flow within the duct. When the collection bag becomes full, high pressure within the duct forces the indicating member to its raised position, where it is visible to the driver through a window formed in the side of the housing.

12 Claims, 2 Drawing Sheets 5,388,394

1

LAWN MOWER GRASS COLLECTION INDICATOR

BACKGROUND OF THE INVENTION

1. Field

This invention relates to lawn mowers having grass collection bags and, more particularly, to an indicator for use with such lawn mowers for visually indicating the full condition of the bag.

2. Description of the Prior Art

It is common practice to provide both riding and walk behind lawn mowers with a grass collection system for retaining clippings of cut grass to be disposed of. It is generally difficult for the user of a mower to determine that the bag is full without physically touching, shaking, or otherwise inspecting the bag, which usually requires interruption of the mowing operation. Typically, on riding lawn mowers, the grass collection bag is mounted at the rear of the mower behind the driver, and is operatively connected to the cutting deck by a discharge chute through which grass clippings are directed. The location of the bag on a riding mower makes inspection particularly difficult and time consuming.

British Patent Application No. GB 2,101, 864, published Jan. 26, 1983, discloses a grass collection indicator which attempts to solve the above mentioned problem. This British application discloses a cylindrical float disposed within a housing secured to the top portion of a grass collection bag, with the float rising or falling depending upon the pressure within the bag. A window in the top of the housing enables the user to see the float in its raised position, which is maintained so long as sufficient air flow into the bag is present. When the bag becomes full, the air flow is reduced and the float falls, thereby alerting the user to the full condition of the bag. In an alternative embodiment, the cylindrical float is replaced by a thin membrane operating in substantially the same manner.

The apparatus shown in the British '864 reference, however, is only adapted for use on a walk behind mower and could not be effectively converted for use on a riding mower. Positioning the indicator directly on the collection bag would be impractical on a riding mower having a rear mounted bag. Accordingly, a need has been recognized for an indicator specially adapted for use on riding mowers.

BRIEF SUMMARY OF THE INVENTION

It is an object of the present invention to provide an indicator for visually displaying the full condition of a grass collection bag on a lawn mower, specially adapted for use on a riding mower.

It is a further object to provide such an indicator which is viewable by the rider of the mower while in the normal mowing position.

In order to achieve these and other objects, the present invention comprises an indicator apparatus for use on a riding lawn mower having a grass collection bag communicating with the cutting deck through a discharge duct, said indicator being disposed on the duct and being operative to signal the driver of the mower when the bag becomes substantially full of grass clippings. The indicator apparatus comprises a housing secured to the duct in an area visible to the driver during normal cutting operation, the housing having a compartment communicating with the interior of the duct through a suitable opening in the duct. Venturi means disposed within the duct adjacent the opening create a pressure differential in the vicinity of the opening in response to air flow through the duct, wherein relatively low pressure is developed in the vicinity when the air flow is high, corresponding to the bag being empty or only partially filled, and relatively high pressure is developed when the air flow is reduced, corresponding to the bag being substantially full. A window is formed in the housing to provide visibility into the interior thereof, and a vent is formed in the housing to provide communication between the compartment and the atmosphere. An indicating member is disposed within the interior compartment, movable between first and second positions in response to the pressure within the duct, said indicating member being drawn downwardly and retained against the opening in said first position by the relatively low pressure in the duct, and being pushed upwardly and retained against the window by the relatively high pressure in said second position. When in its second position, the indicating member is visible to the driver through the window, thereby alerting the driver to the substantially full condition of the bag.

DETAILED DESCRIPTION OF THE PREFERRED EMBODIMENT

Figure 1:
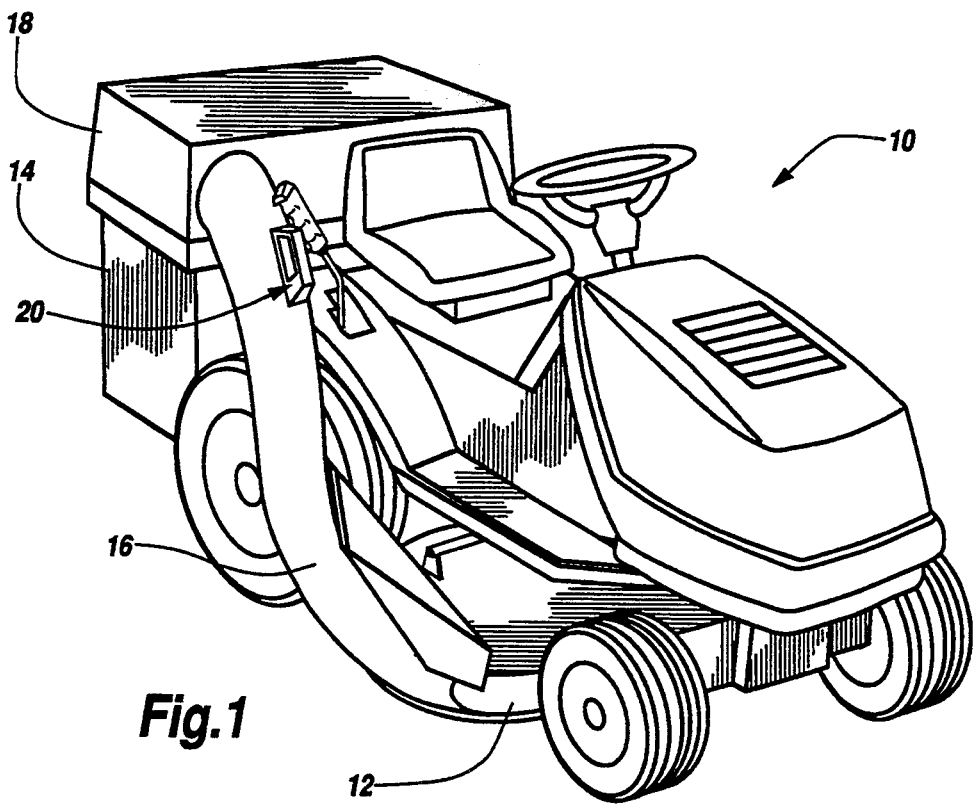
FIG. 1 is a top, front perspective view of a riding mower incorporating the indicator apparatus according to the teachings of the present invention.

Referring initially to FIG. 1, riding mower 10 is shown having a generally conventional cutting deck 12 and grass collection bag 14 incorporated thereon. As with other mowers well known to those skilled in the art, cutting deck 12 serves as a housing for one or more rotating cutting blades when in operation to cut the grass and direct a flow of air carrying the grass clippings through discharge duct 16 into the top portion 18 of bag 14. Unlike mowers known in the art, riding mower 10 also incorporates a bag full indicator 20 operatively secured to duct 16, as discussed in more detail below, in a convenient position so that the driver of mower 10 can ascertain at a glance whether or not bag 14 has become full. It will be appreciated that the precise placement of indicator 20 along duct 16 may be varied without departing from the scope of this invention.

Figure 2:
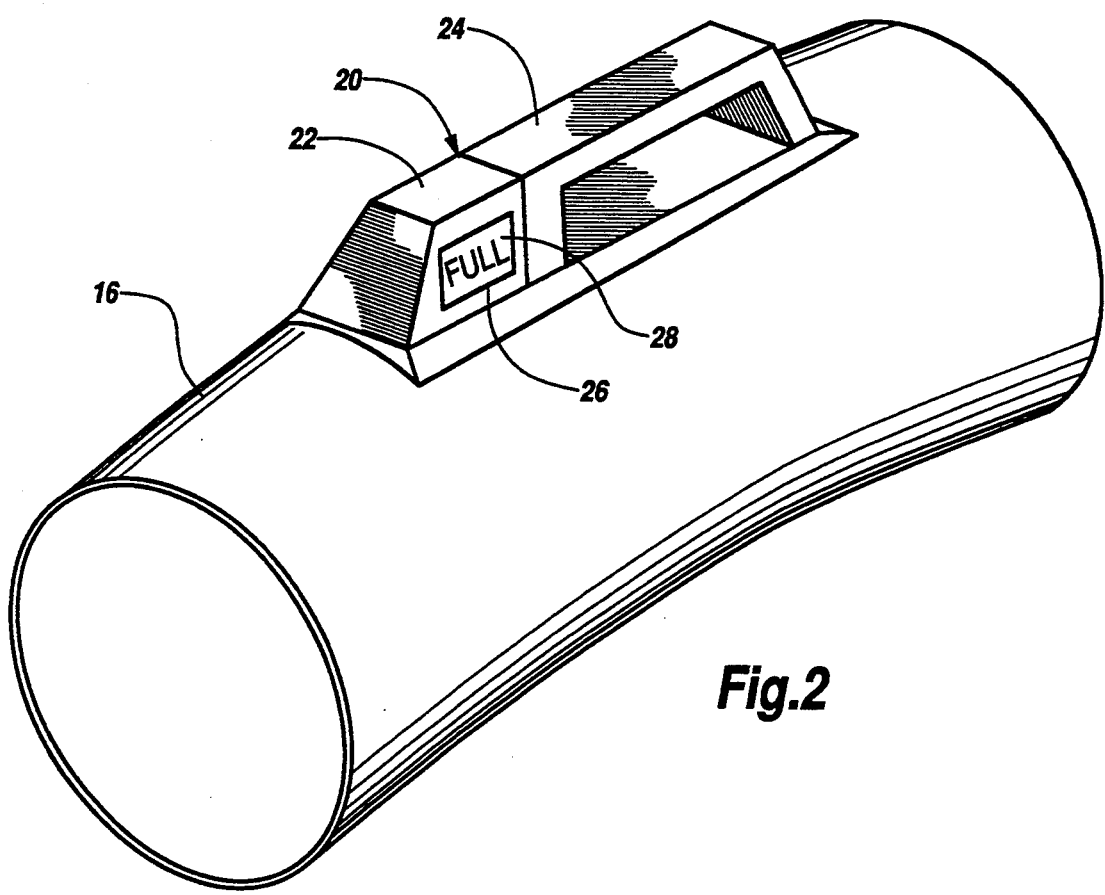
FIG. 2 is an enlarged perspective view of a portion of the discharge duct of the mower shown in FIG. 1, showing the indicator signaling the full condition of the grass collection bag.

As best shown in FIG. 2, the preferred embodiment of indicator 20 comprises a housing defining front compartment 22 and handle 24. One side of compartment 22 includes a window 26 formed therein, through which indicating member 28 may be seen by the driver of mower 10 when member 28 is in its raised, or "full", position as shown. Handle 24 serves as convenience carrying means whenever discharge duct 16 is removed from mower 10. It will be appreciated that the external configuration of indicator 20 and, in particular, the inclusion of handle 24, are largely optional for purposes of this invention.

Figure 3:
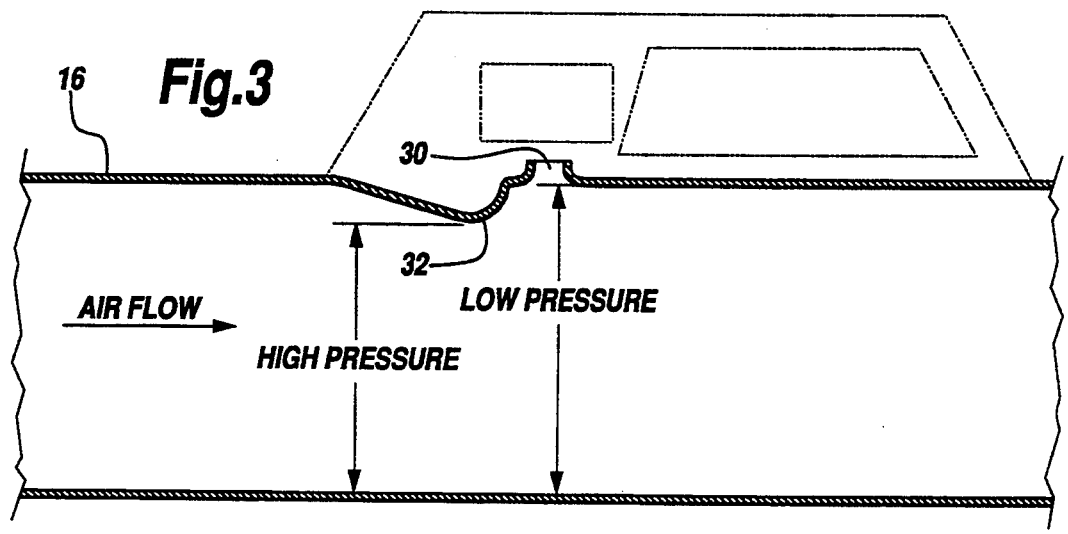
FIG. 3 is a side sectional view of the section of discharge duct shown in FIG. 2.
Figure 4:
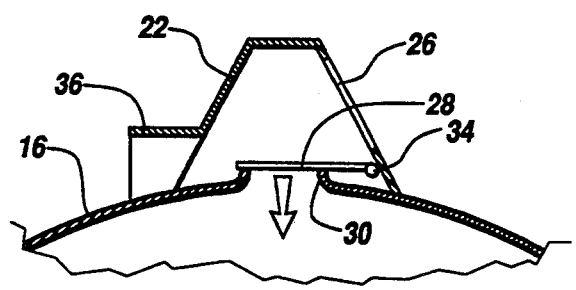
FIG. 4 is a sectional view taken through the indicator apparatus showing the indicating member in its lowered position.
Figure 5:
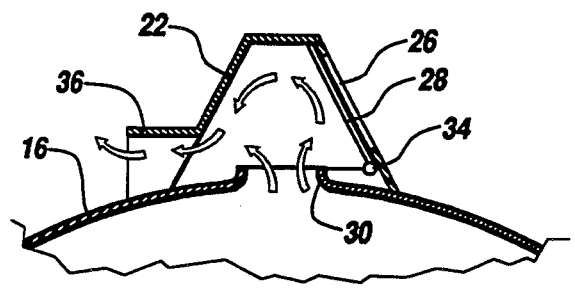
FIG. 5 is a sectional view similar to FIG. 4, showing the indicating member in its raised position indicating the full condition of the grass collection bag.

Referring now to FIGS. 3-5, it is seen that duct 16 has an opening 30 formed therein beneath compartment 22, thereby providing communication between the interior of compartment 22 with the interior of duct 16. Protrusion 32 is formed in the wall of duct 16 upstream of opening 30. Protrusion 32 serves as a constriction within duct 16, thereby creating a venturi effect resulting in a reduced pressure area in the vicinity of opening 30 during normal operation of mower 10 prior to bag 14 becoming full. As shown in FIG. 3, the normal air flow through duct 16 creates relatively high pressure therein, particularly in the vicinity of protrusion 32, and relatively low pressure in the vicinity of opening 30. When collection bag 14 becomes full, the air flow through duct 16 is reduced significantly, resulting in relatively high pressure throughout the interior of duct 16, including the vicinity of opening 30.

FIG. 4 illustrates the position of indicating member 28 during operation of mower 10 prior to collection bag 14 becoming full. As mentioned above, the relatively high air flow rate through duct 16 creates a low pressure area in the vicinity of opening 30 so that indicating member 28, being hingedly mounted within compartment 22 at hinge 34, is drawn downward. So long as indicating member 28 is in its lowered position, the driver of mower 10 viewing indicating member 28 through window 26 is assured that collection bag 14 is not full.

When collection bag 14 becomes substantially full, the air flow through duct 16 is reduced as described above, and the resulting high pressure in the vicinity of opening 30 forces indicating member 28 upward to its raised position, as shown in FIG. 5. A vent 36 formed in the rear of compartment 22 allows the air to escape to the atmosphere, thereby creating sufficient air flow through compartment 22 to maintain indicating member 28 in its raised position. Indicating member 28 may be painted a bright color to attract the attention of the driver of mower 10, or may include verbal indicia such as the word "FULL" thereon, as shown in FIG. 2.

As disclosed herein, indicating member 28 is in the form of a flap hingedly secured within compartment 22 and rotatable about hinge 34 between first and second positions. It is contemplated that the function of indicator mechanism 28 could be served by a floating piston or some sort of membrane.

While the principles of providing a bag full indicator for a riding mower have been made clear by the above disclosure, it will be immediately apparent to those skilled in the art that there are many possible modifications to the disclosed arrangement without departing from the basic spirit of the present invention. In particular, while the preferred embodiment of this invention is adapted for use on a riding mower, it will be understood that the apparatus could easily be adapted for use on a walk behind mower. Accordingly, the following claims are intended to cover and embrace not only the specific embodiment disclosed herein, but also such modifications within the spirit and scope of this invention.

What is claimed is:

1. Indicator apparatus for use on a riding lawn mower having a grass collection bag communicating with the cutting deck through a discharge duct, said indicator being disposed on said duct and being operative to signal the driver of the mower when said bag becomes substantially full of grass clippings, said apparatus comprising:

a housing secured to said duct in an area visible to the driver of said mower during normal cutting operation thereof, said housing having an interior compartment an opening formed in a portion of duct covered by said housing, said opening allowing communication between said interior compartment and said duct;

venturi means within said duct immediately adjacent said opening for creating a pressure differential at said opening in response to air flow through said duct, wherein relatively low pressure is developed when said air flow is high, corresponding to said bag being not full, and relatively high pressure is developed when said air flow is reduced, corresponding to said bag being substantially full;

a window formed in said housing in a side portion of said interior compartment;

a vent formed in said housing providing communication between said interior compartment and the atmosphere; and an indicating member disposed within said interior compartment, moveable between first and second positions in response to the pressure within said duct, in said first position said indicating member being retained against said opening by said relatively low pressure in said duct, and in said second position said indicating member being retained against said window by said relatively high pressure in said duct, wherein said indicating member is visible through said window to the driver of said mower when said indicating member is in said second position, thereby alerting the driver to the substantially full condition of said bag.

2. Indicator apparatus as set forth in claim 1, wherein: said indicating member comprises a flap hingedly secured to said housing within said compartment.

3. Indicator apparatus as set forth in claim 1, wherein: said venturi means comprise a protrusion formed in said duct closely adjacent and upstream of said opening.

4. Indicator apparatus as set forth in claim 1, wherein: said indicating member includes verbal indicia disposed thereon, said indicia being visible through said window when said indicating member is in said second position and being further operative to alert the driver of the substantially full condition of said bag.

5. Indicator apparatus as set forth in claim 4, wherein said verbal indicia comprises the word "FULL".

6. Indicator apparatus as set forth in claim 1, wherein: said housing includes a handle formed contiguously with said compartment, said handle being adapted for lifting and carrying said discharge duct.

7. A lawn mower comprising:
   a cutting deck;
   a grass collection bag for retaining grass clippings;
   a discharge chute, operatively secured to said cutting deck and said grass collection bag and establishing communication therebetween;
   an indicator associated with said discharge chute for providing a visual indication of said bag becoming substantially full of grass clippings, said indicator comprising:

a housing secured externally to said discharge chute, having an interior compartment in communication with said chute through a hole formed in said chute;

venturi means within said discharge chute for creating a zone of low pressure in an area encompassing said hole when air flow through said chute is relatively high;

an indicating member moveable between first and second positions in response to low and high air pressure, respectively, occurring at said zone within said discharge chute, said zone experiencing relatively low pressure when said bag is not full and relatively high pressure when said bag is substantially full, wherein said indicating member is visually conspicuous when in said second position corresponding to said bag being substantially full.

8. A lawn mower as set forth in claim 7, wherein said indicator further comprises:

a window formed in said compartment, through which said indicating member is visible when in said second position.

9. A lawn mower as set forth in claim 8, wherein:

said indicating member comprises a flap hingedly secured to said housing within said compartment.

10. A lawn mower as set forth in claim 8, wherein:

said indicating member includes verbal indicia disposed thereon, said indicia being visible through said window when said indicating member is in said second position and being further operative to alert the driver of the substantially full condition of said bag.

11. A lawn mower as set forth in claim 10, wherein said verbal indicia comprise the word "FULL".

12. A lawn mower as set forth in claim 8 wherein:

said housing includes a handle formed contiguously with said compartment, said handle being adapted for lifting and carrying said discharge duct.

* * * * *